US010669612B2

(12) United States Patent
Cattaneo et al.

(10) Patent No.: US 10,669,612 B2
(45) Date of Patent: Jun. 2, 2020

(54) LEAD ALLOY, ELECTRODE AND ACCUMULATOR

(71) Applicant: Hoppecke Batterien GmbH & Co. KG, Brilon (DE)

(72) Inventors: Eduardo Cattaneo, Brilon (DE); Bernhard Riegel, Brilon (DE)

(73) Assignee: Hoppecke Batterien GmbH & Co. KG, Brilon (DE)

( * ) Notice: Subject to any disclaimer, the term of this patent is extended or adjusted under 35 U.S.C. 154(b) by 0 days.

(21) Appl. No.: 16/526,064

(22) Filed: Jul. 30, 2019

(65) Prior Publication Data

US 2020/0040430 A1 Feb. 6, 2020

(30) Foreign Application Priority Data

Jul. 31, 2018 (EP) .................... 18186629

(51) Int. Cl.
   *C22C 11/00* (2006.01)
   *H01M 10/06* (2006.01)
   *H01M 4/14* (2006.01)
   *H01M 4/73* (2006.01)
   *H01M 4/38* (2006.01)

(52) U.S. Cl.
   CPC .............. *C22C 11/00* (2013.01); *H01M 4/14* (2013.01); *H01M 4/38* (2013.01); *H01M 4/73* (2013.01); *H01M 10/06* (2013.01)

(58) Field of Classification Search
   CPC ........ C22C 11/00; C22C 11/06; H01M 10/06; H01M 4/14; H01M 4/73; H01M 4/16
   See application file for complete search history.

(56) References Cited

U.S. PATENT DOCUMENTS

| 2,860,969 A | 11/1958 | Walsh |
| 4,544,014 A | 10/1985 | McLane et al. |
| 6,180,286 B1 | 1/2001 | Rao et al. |

FOREIGN PATENT DOCUMENTS

| CN | 103137978 A | * | 6/2013 | |
| CN | 103137978 A | | 6/2013 | |
| GB | 1414171 A | * | 11/1975 | ............ H01M 4/685 |
| JP | 54157725 | * | 12/1979 | |
| JP | 2006079951 A | * | 3/2006 | |
| JP | 2006079951 A | | 3/2006 | |
| JP | 2008130231 A | | 6/2008 | |

OTHER PUBLICATIONS

European Extended Search Report issued in related EP application No. 18186629.4 dated Jan. 21, 2019.

* cited by examiner

*Primary Examiner* — Basia A Ridley
*Assistant Examiner* — Heng M. Chan
(74) *Attorney, Agent, or Firm* — Harness, Dickey & Pierce, P.L.C.

(57) ABSTRACT

A calcium-free lead alloy comprises lead and 0.003 wt %-0.025 wt % of at least two rare-earth metals. The rare-earth metals are at least a lanthanide and yttrium. Uses of the lead alloy include an electrode with an electrode structure, which is at least partly formed of the lead alloy and a lead-acid accumulator with the electrode.

7 Claims, No Drawings

LEAD ALLOY, ELECTRODE AND ACCUMULATOR

CROSS-REFERENCE TO RELATED APPLICATIONS

This application claims the benefit and priority of European Patent Application No. 18186629.4, filed on Jul. 31, 2018. The entire disclosure of the above application is incorporated herein by reference.

FIELD

The disclosure relates to lead alloys, comprising at least one rare-earth metal, uses for the lead alloys according to the disclosure, an electrode, comprising an electrode structure, consisting at least partly of one of the lead alloys according to the disclosure, and a lead-acid accumulator, comprising an electrode according to the disclosure.

BACKGROUND

Lead alloys as a material for electrode structures for use in lead-acid accumulators are known per se from the prior art. Electrodes usually comprise a solid electrode structure which serves to receive a paste-like active electrode material. The electrode structure is usually configured as an electrode grid. From the prior art, however, also other forms have been known. In relation to the lead alloys, regardless of the actual form of the electrode structures, they are usually called electrode grid alloys.

Several factors play a role in selecting the lead alloy. On the one hand, it is required that the lead alloy can be processed into electrode structures in an economically sensible manner. Furthermore, the lead alloy must have a comparably good mechanical stability in order to be able to bear both its own comparably high weight and the weight of the electrode paste throughout the service life of the accumulator. Moreover, when used as intended in a lead-acid accumulator, the electrode structure is always in contact with a highly corrosive electrolyte, on the one hand, and with the corrosive components of the active electrode paste, on the other hand. Therefore, in addition to the properties mentioned above, the lead alloy must be corrosion-resistant.

In this context, alloys containing lead, calcium, and cerium have been known for instance from U.S. Pat. No. 2,860,969 A. The publication deals with overcoming the disadvantages of lead-antimony alloys as a material for electrode grids. Originally, antimony was used in lead alloys in order to provide mechanical stability to the alloy. The concretely proposed alloy containing PbCaSnCe provides calcium as a substitute for antimony in order to provide the required mechanical stability and to prevent the deposition of antimony on the negative plate due to positive grid corrosion. As is well known, the contamination of the negative active paste by antimony leads to increased water loss by electrolysis and sulphation of the negative plates.

The alloying component cerium, on the other hand, serves to improve the corrosion properties by refinement of the grain sizes. Grids with coarse-grained structures have webs and frames consisting of a few grains. In this case, the corrosive attack on grain boundaries quickly penetrates deeply into webs and frames. This kind of intergranular corrosion usually results in an early disintegration of grids.

The disadvantage of electrode structures made of the alloys mentioned above, however, is that during operation as intended, they have an inclination towards grid growth, which may lead to results from an impairment of the positive connection of the grid paste to considerable capacitance losses of the accumulator. The grid growth phenomenon is the result of a lack of creep resistance of the grid alloys increasing over the course of time. This irreversible loss of mechanical strength is also called "overageing". Under these conditions, the increasing thickness of the corrosion layer generates an axial force which leads to a considerable expansion of the grid webs and frames.

SUMMARY

Accordingly, the disclosure is based on the complex technical objective to provide an alloy which is suitable as a material for electrode structures, i. e. which can be processed in an economically sensible manner in industrial production, which has sufficient mechanical stability and corrosion resistance and, moreover, has an at least reduced tendency towards grid growth during operation in a lead-acid accumulator.

In order to achieve the objective, the disclosure proposes a lead alloy comprising lead and 0.003 wt %-0.025 wt % of at least one rare-earth metal, wherein the lead alloy is calcium-free.

Among the "rare-earth metals" for the purpose of the disclosure are the metals of the group of lanthanides and the metals of the 3rd subgroup of the periodic table, scandium and yttrium. The term "lead alloy" is used to denote an alloy composition which comprises lead in a predominant part by weight. Together with the predominant rest of lead, the indicated potential further alloying components add up to 100 wt %.

DETAILED DESCRIPTION

The disclosure is based on the realisation that calcium as an alloying component in lead alloys is primarily responsible for the undesired grid growth during operation in lead-acid accumulators. The lead alloy according to the disclosure makes use of the synergetic effect of a combination of lead and rare-earth metals in the indicated composition in order to obtain an alloy which, in comparison with the lead alloys known from the prior art, shows a reduced growth.

In turning away completely from the prior art, it turned out, surprisingly, that calcium-free lead alloys which comprise only a rare-earth metal as another essential component meet in particular the mechanical requirements placed on an electrode grid alloy. This had not been expected, since previously, experts had started from the assumption that either antimony or calcium were compulsory alloying components for hardening in order to guarantee the required mechanical stability of the lead alloy. Moreover, by completely dispensing with calcium as an alloying component, the production method of the alloy is simplified and the floor space requirements for the provision of calcium are reduced. "Calcium-free" for the purpose of the disclosure means that calcium is not an appropriate component of the alloy. For this purpose, the lead alloy is kept free from components containing calcium, as far as this is technically possible and economically reasonable. Nevertheless, the lead alloy may contain calcium contaminations which cannot be avoided by economically justifiable efforts. These contaminations, however, if any should be present, have no impact on the properties of the alloy.

According to the disclosure, the calcium-free lead alloy comprises at least one rare-earth metal. This is preferably a lanthanide, a misch metal comprising at least two lanthanides, and/or yttrium. Lanthanum, cerium, lanthanum-cerium misch metal, and/or yttrium have been proved to be particularly favourable both for the mechanical stability of the alloy and for its corrosion resistance. According to a particularly preferred feature of the disclosure, the lead alloy comprises yttrium and at least one lanthanide or a misch metal consisting thereof. In particular the combination of yttrium and lanthanum has proved to be particularly favourable with respect to mechanical stability, corrosion resistance, and inhibition of grid growth when used as intended.

According to the disclosure, the part by weight of the at least one rare-earth metal is 0.003 wt % to 0.025 wt %. The part by weight of the at least one rare-earth metal is preferably 0.005 wt % to 0.020 wt %. Particularly preferred calcium-free lead alloys in this context are Pb—La—Y, Pb—Ce—Y, or Pb—La—Ce—Y. With respect to the quantitative composition, in particular the alloys Pb—La0.01-Y0.01, Pb—Ce0.01-Y0.01, or Pb—La0.01-Ce0.005-Y0.005 are preferred.

Although a calcium-free lead alloy consisting exclusively of 0.005 wt %-0.025 wt % of at least one rare-earth metal and a rest of lead adding up to 100 wt % is fully suitable as an electrode grid alloy, it is provided according to a preferred embodiment of the disclosure that the lead alloy comprises further alloying components. These alloying components have been selected from the group Sn, Ag, Ba, Bi and Al. The alloying components serve to improve various properties of the lead alloy. In particular, they serve to optimise the lead alloy for various processing methods. In the field of foundry technology, such processing methods comprise in particular drop casting, die casting, continuous casting (e. g. ConCast according to U.S. Pat. No. 4,544,014), and rolling mill and die stamping techniques.

In combination with the calcium-free lead alloy according to the disclosure, the above-mentioned optional alloying components have the following technical effects:

Tin (Sn) slows down the overageing of the structure, increases the conductivity of the corrosion layers, and thereby contributes to an increase in the current consumption ability, cycle stability, and the recovery capacity of the batteries after total discharge. The part by weight of Sn in the alloy is preferably not more than 2.0 wt %. Particularly preferably, it is between 0.2 wt % and 2.0 wt %.

Silver (Ag) improves corrosion resistance and increases the creep resistance of the lead alloys at high temperatures. The part by weight of Ag in the alloy is preferably no more than 0.035 wt %. Particularly preferably, it is between 0.008 wt % and 0.035 wt %.

Barium (Ba) (even in relatively small quantities) increases the mechanical strength of lead alloys. The part by weight of Ba in the alloy is preferably no more than 0.07 wt %. Particularly preferably, it is between 0.03 wt % and 0.07 wt %.

Bismuth (Bi) contributes to grid hardness. The part by weight of Bi in the alloy is preferably no more than 0.03 wt %. Particularly preferably, it is between 0.005 wt % and 0.03 wt %.

Aluminium (Al) protects the melts in the production process of the lead alloy against oxidation by air. Preferably, Al is used only in combination with Ba, since melts containing barium in particular tend to oxidate by air. The part by weight of Al in the alloy is preferably no more than 0.012 wt %. Particularly preferably, it is between 0.005 wt % and 0.012 wt %.

Furthermore, the disclosure relates to the use of the lead alloys according to the disclosure as a material for an electrode structure for lead-acid accumulators. Preferably they are used as a material for an electrode grid. By the use of the lead alloys as intended by the disclosure, an electrode structure suitable for use in a lead-acid accumulator can be provided the service life of which is extended at least by a decreased growth effect of the electrode structure when used as intended.

Moreover, the lead alloys according to the disclosure can be used in various processing methods, in particular in the field of casting technology. The lead alloys according to the disclosure are preferably provided for use as a starting material in a production method for electrode structures, in particular electrode grids.

For processing calcium-free lead alloys, continuous casting methods are preferred.

One of the preferred continuous casting methods is the ConCast method.

In this technology, which is described in U.S. Pat. No. 4,544,014, a cylindrical rotating drum assumes the role of the casting mould. The grid patterns in the form of a grid ribbon are engraved on the circumferential surface of the casting drum. The cavities of the engraving (i. e. the webs and frames) are filled with melted lead under pressure which is supplied through holes from the opening slots of a casting shoe.

Another also preferred possibility for continuous grid ribbon production is the rolling mill and die stamping method: In this method, initially a thick strip is cast continuously. The strip thickness of approx. 10 mm is reduced to 1 mm thickness immediately after casting by exposure to 4 to 6 rolling stages. Subsequently, the lead alloy strip of 1 mm thickness is stamped out to become a grid ribbon with any desired grid pattern.

Due to the selection of its components, the lead alloy is relatively well workable, a fact which, in contrast to alloys known from the prior art, enables it to be used in the most various processes.

Moreover, the disclosure relates to an electrode for a lead-acid accumulator with an electrode structure which structure is formed at least partly of at least one of the lead alloys according to the disclosure. According to a preferred embodiment of the disclosure, the electrode structure is formed completely from only one of the lead alloys according to the disclosure. By use of the lead alloys according to the disclosure, the service life of the electrode and of the accumulator on the whole are improved.

According to a preferred further development of the disclosure, the electrode comprises a paste-like active mass which is received by the electrode structure. It has turned out that the lead alloys according to the disclosure interact particularly well with the active electrode paste. The adhesion of the active electrode paste to the electrode structure is thereby increased, providing the electrode as a whole with an improved mechanical stability and an improved charging and discharging behaviour.

The disclosure further relates to a lead-acid accumulator comprising an electrode according to the disclosure. By the use of an electrode with an electrode structure consisting of a lead alloy according to the disclosure, the service life of the accumulator is improved by a reduction of electrode growth. Therefore, a lead-acid accumulator with a comparably long service life is provided. The lead-acid accumulator is preferably a VRLA accumulator (valve-regulated lead-acid accumulator). As a result, the accumulator is in particular suitable for use in traction batteries and stationary installations.

The following are examples of preferred alloy compositions:

| Exemplary embodiment 1 | |
|---|---|
| 0.005 wt %-0.025 wt % | La |
| Rest | Pb. |

| Exemplary embodiment 2 | |
|---|---|
| 0.005 wt %-0.025 wt % | Ce |
| Rest | Pb. |

| Exemplary embodiment 3 | |
|---|---|
| 0.005 wt %-0.025 wt % | Y |
| Rest | Pb. |

| Exemplary embodiment 4 | |
|---|---|
| 0.008 wt %-0.025 wt % | La |
| 0.008 wt %-0.025 wt % | Y |
| Rest | Pb. |

| Exemplary embodiment 5 | |
|---|---|
| 0.008 wt %-0.025 wt % | La |
| 0.008 wt %-0.025 wt % | Ce |
| Rest | Pb. |

| Exemplary embodiment 6 | |
|---|---|
| 0.008 wt %-0.025 wt % | Ce |
| 0.008 wt %-0.025 wt % | Y |
| Rest | Pb. |

| Exemplary embodiment 7 | |
|---|---|
| 0.008 wt %-0.025 wt % | La |
| 0.008 wt %-0.025 wt % | Ce |
| 0.008 wt %-0.025 wt % | Y |
| Rest | Pb. |

| Exemplary embodiment 8 | |
|---|---|
| 0.1 wt %-0.8 wt % | Sn |
| 0.008 wt %-0.025 wt % | La |
| 0.008 wt %-0.025 wt % | Y |
| Rest | Pb. |

| Exemplary embodiment 9 | |
|---|---|
| 0.1 wt %-0.8 wt % | Sn |
| 0.008 wt %-0.025 wt % | La |
| 0.008 wt %-0.025 wt % | Ce |
| Rest | Pb. |

| Exemplary embodiment 10 | |
|---|---|
| 0.1 wt %-0.8 wt % | Sn |
| 0.01 wt %-0.025 wt % | Ag |
| 0.008 wt %-0.025 wt % | La |
| 0.008 wt %-0.025 wt % | Y |
| Rest | Pb. |

| Exemplary embodiment 11 | |
|---|---|
| 0.1 wt %-0.8 wt % | Sn |
| 0.01 wt %-0.025 wt % | Ag |
| 0.008 wt %-0.025 wt % | La |
| 0.008 wt %-0.025 wt % | Ce |
| Rest | Pb. |

What is claimed is:

1. A calcium-free lead alloy, consisting of:

| | |
|---|---|
| 0.003 wt %-0.025 wt % | of at least two rare-earth metals |
| 0.0 wt %-2.0 wt % | Sn |
| 0.0 wt %-0.035 wt % | Ag |
| 0.0 wt %-0.07 wt % | Ba |
| 0.0 wt %-0.03 wt % | Bi |
| 0.0 wt %-0.012 wt % | Al |
| Rest | Pb; | wherein the sum of all parts by weight of the alloying components in the lead alloy amounts to 100 wt %, wherein the rare-earth metals are at least a lanthanide and yttrium.

2. The calcium-free lead alloy according to claim 1, comprising:

| | |
|---|---|
| 0.01 wt %-0.8 wt % | Sn |
| 0.01 wt %-0.025 wt % | Ag. |

3. The calcium-free lead alloy according to claim 1, wherein the lanthanide is La, Ce, or a LaCe misch metal.

4. The calcium-free lead alloy according to claim 1, comprising:

| | |
|---|---|
| 0.003 wt %-0.012 wt % | of at least one lanthanide |
| 0.003 wt %-0.012 wt % | of Y. |

5. An electrode for a lead-acid accumulator with an electrode grid, which structure is formed at least partly of at least one calcium-free lead alloy according to claim 1.

6. The electrode according to claim 5, comprising a paste-like active electrode mass which is received by the electrode grid.

7. A lead-acid accumulator, comprising an electrode according to claim 5.

* * * * *